United States Patent
Bashark

[11] 3,870,417
[45] Mar. 11, 1975

[54] SENSOR FOR DISHWASHER

[75] Inventor: Larry Thomas Bashark, St. Joseph, Mich.

[73] Assignee: Whirlpool Corporation, Benton Harbor, Mich.

[22] Filed: July 17, 1973

[21] Appl. No.: 380,101

[52] U.S. Cl. ............... 356/208, 134/57 D, 356/209
[51] Int. Cl. .......................................... G01n 21/24
[58] Field of Search ........... 356/208, 209, 134, 136; 73/290 R; 134/56 D, 57 D, 58 D

[56] References Cited
UNITED STATES PATENTS

| | | | |
|---|---|---|---|
| 2,503,770 | 4/1950 | Robinson | 250/230 |
| 2,884,783 | 5/1959 | Spengler | 356/156 |
| 3,279,481 | 10/1966 | Sones et al. | 134/57 D |
| 3,504,184 | 3/1970 | Eaton et al. | 250/227 |
| 3,714,444 | 1/1973 | Carr et al. | 356/208 |

Primary Examiner—Ronald L. Wibert
Assistant Examiner—Richard A. Rosenberger
Attorney, Agent, or Firm—Hofgren, Wegner, Allen, Stellman & McCord

[57] ABSTRACT

A method and apparatus for determining the condition of liquid, such as a dishwashing liquid, including means for determining the turbidity of the liquid and means for determining a preselected amount of evaporation of the liquid so as to determine a dryness condition. Means are provided for directing light radiation upwardly into the liquid and for sensing the light radiation reflected either from solids carried by the liquid to provide a turbidity determination or reflected from the underside of the upper surface of the liquid to provide a dryness determination.

28 Claims, 3 Drawing Figures

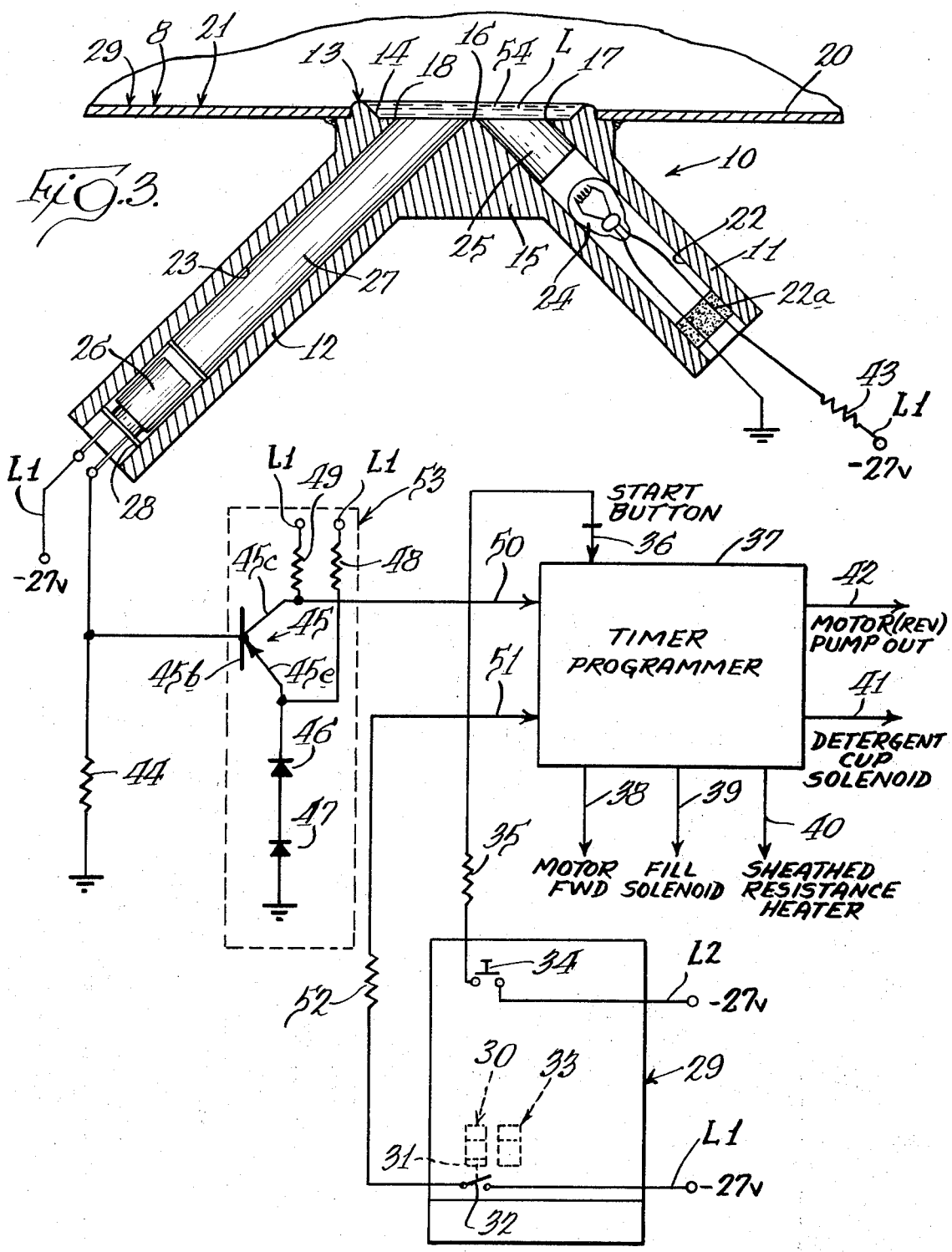

SENSOR FOR DISHWASHER

BACKGROUND OF THE INVENTION

1. Field of the Invention

This invention relates to controls and in particular to a method of sensing liquid conditions and means for effecting the same.

2. Description of the Prior Art

In a number of washing apparatuses, such as dishwashers and clothes washers, devices have been provided for determining the turbidity of the washing liquid for automatically controlling operation of the apparatus. Similarly in such devices, different means have been provided for determining the level of the liquid for providing additional control of the operation of the apparatus. One example of a turbidity control of this type is shown in U.S. Pat. No. 3,114,253 of E. D. Morey et al. wherein a turbidity sensor is provided having a light source which impinges on a resistor to control the relative charge of a pair of capacitors as a function of the amount of light passed through a body of the washing liquid between the light and resistors. A similar control is shown in U.S. Pat. No. 3,279,481 of W. L. Sones et al. for use in a dishwasher. Therein a light beam is directed through a turbidity sensing sight glass to be sensed by a light sensitive resistor. The amount of dryness is sensed by a resistor having a positive coefficient of resistance as a function of sensed humidity.

In U.S. Pat. No. 2,218,698 of K. Clark the illumination is reflected or diffused by the presence of soap suds so as to control the amount of suds-forming ingredient introduced into the clothes washer.

In the U.S. Pat. No. 3,074,277 of U. T. Hill, a colorometer is utilized for measuring the ferrous sulfide content of an acid bath, wherein the bath is passed through an absorption cell having transparent walls with a light beam passed therethrough to be sensed by a suitable sensing device.

In U.S. Pat. No. 3,504,184 of C. A. Eaton et al, a smoke detection apparatus sensitive to particulate matter is essentially transparent media is provided wherein light emanating from a hollow recess is reflected from smoke particles in a stream of air to a light sensitive cell located in an adjacent hollow recess thereby providing an alarm.

In U.S. Pat. No. 3,399,652 of S. A. Gawron, a toner concentrate detector includes means for reflecting a light beam off a deposit of the toner on a surface structure to a photoelectric sensor with the intensity of the light striking the sensor being a function of the amount of toner on the surface.

In U.S. Pat. No. 1,940,373 of V. A. Schoenberg, a method of oil testing is shown wherein light is passed through a sample of the oil held in a small well and sensed by a subjacent photocell.

In U.S. Pat. No. 2,968,688 of K. R. Skinner, a rain sensor is shown to comprise a device having a well for receiving a drop of rain and provided with electrical terminals which are bridged by the drop to provide a signal.

U.S. Pat. No. 2,503,770 of P. W. Robinson shows a tank level control wherein light is reflected off the top surface of liquid in a tank to a photocell to determine the liquid level.

In U.S. Pat. No. 2,771,892 of Z. O. St. Palley, light is passed from a lamp through a tube to a photocell to vary as a function of whether the tube contains air or fluid.

In U.S. Pat. No. 3,116,982 of O. T. McIlvaine, a humidity responsive drying apparatus is provided wherein the amount of light reflected from a chemically treated surface is sensed to provide a dryness indication in accordance with the change in color of the surface caused by changes in the dryness of the air directed thereagainst.

In U.S. Pat. No. 3,013,400 of V. G. Sharpe, water comprising melted frost in a refrigerator apparatus is collected around a thermistor to provide a heat transfer controlling the flow of current to a heating element.

In U.S. Pat. No. 3,511,572 of J. L. Peube, a means for measuring a liquid level is provided comprising means for directing light at the curved miniscus, or similar curved portion of a body, to cause the reflected light to envelop a caustic and form interference fringes, with the fringes then being observed without magnification to indicate the position of the curved surface.

SUMMARY OF THE INVENTION

The present invention comprehends an improved method and means for sensing a liquid condition which is extremely simple and low cost.

More specifically, the invention comprehends the provision of a method of determining turbidity and evaporation of a liquid comprising directing radiation upwardly into the liquid, directing a radiation sensing means into the liquid at an angle to the direction of radiation thereto to sense radiation reflected from solids carried by the liquid and sense radiation reflected from the underside of the upper surface of the liquid, and providing selectively a first, turbidity measure output corresponding to the sensed reflection from the solids in the liquid and a second, evaporation measure output corresponding to the sensed reflection from the undersurface of the liquid.

The liquid condition sensor of the present invention comprises means defining a well having a bottom wall, means for directing preselected light upwardly through the bottom wall to be redirected downwardly by a liquid in the well and thereabove, means for sensing light so deflected, and means providing an output signal corresponding to the level of the sensed deflected light.

The output signal means comprise means providing a turbidity output signal corresponding to the level of the light reflected from reflective material carried in the liquid, and a dryness output signal corresponding to the level of the light reflected from the upper surface of the liquid in the well.

The liquid condition sensor control is extremely simple and economical of construction while yet providing the improved functioning discussed above.

BRIEF DESCRIPTION OF THE DRAWING

Other features and advantages of the invention will be apparent from the following description taken in connection with the accompanying drawing wherein:

FIG. 3 is a vertical section of the sensor control with a schematic wiring diagram of the electrical control circuit for the washing appliance in the form of a dishwasher illustrated in connection therewith.

DESCRIPTION OF THE PREFERRED EMBODIMENT

Figure 2:
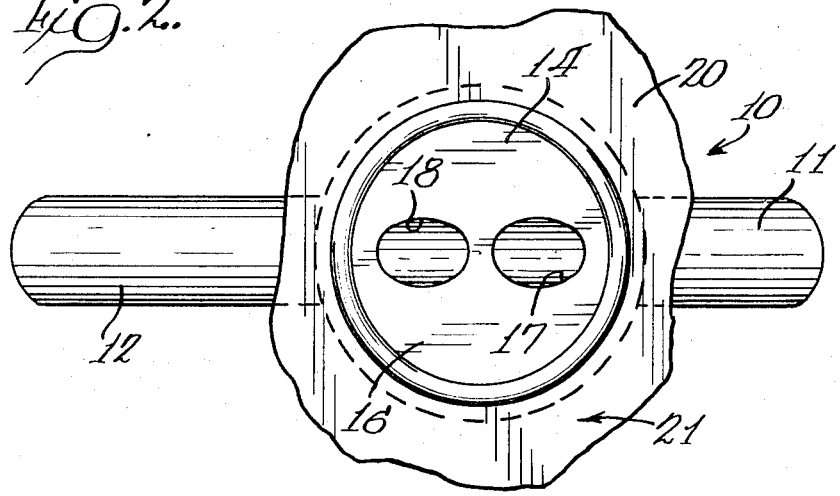
FIG. 2 is a fragmentary top plan view of the structure of FIG. 1.

In the exemplary embodiment of the invention as disclosed in the drawing, a liquid condition sensor control generally designated 10 is shown to comprise a transducer including a light directing means 11, a light sensing means 12, and means 13 defining a well 14 for holding a quantity of the liquid in association with the light directing means 11 and light sensing means 12. The directing means 11 and sensing means 12 are connected by a body portion 15. At the lower end of well 14, body 15 defines a bottom wall 16 having a pair of openings 17 and 18 spaced apart a preselected distance, as illustrated in FIG. 2. The liquid holding means 13 projects upwardly through an opening 19 in the bottom wall 20 of a sump portion 21 of the liquid holder, such as the tub 8 of a dishwasher 29 or a clothes washing machine. The liquid L in the tub 8 extends above the bottom wall 20 and downwardly into well 14 in one operational condition of the apparatus, such as during a dish washing operation or during a clothes washing operation. In a subsequent drying operation, the liquid is drained so as to be removed from above wall 20 while leaving a body of liquid filling the well 14 which liquid normally is subsequently evaporated in the drying cycle.

Referring now to FIG. 3, light directing means 11 comprises a tubular element having an axial bore 22 terminating at its upper end in opening 17 and light sensing means 12 is defined by a tubular element having an axial bore 23 defining at its upper end opening 18. A lamp 24 is mounted in bore 22 below a solid, transparent window element 25 sealingly closing flush with bottom wall 16 the upper end of the bore downwardly adjacent opening 17. Suitable caulking material 22a, such as Dow Corning Corporation RTV Silastic caulking material, may be utilized to seal the leads of lamp 24 in bore 22. A photocell 26 is provided in bore 23 below a window element 27 sealingly closing the upper end of bore 23 downwardly adjacent opening 18. Window 27 extends a greater portion of the length of the bore 23 whereas window 25 is relatively short. The windows 25 and 27 may be formed of a suitable synthetic plastic, such as TPX methylpentene. Alternatively, the windows may be formed of glass, such as Vycor glass. Illustratively, the tubular portions 11 and 12 may have an outer diameter of approximately 0.450 inch, an inner diameter of approximately 0.250 inch with window 25 having an axial length of approximately one half inch and window 27 having an axial length of approximately 1 ⅝inch. The lamp may comprise a GE 1764D lamp rated at 28 volts. In the illustrated apparatus, the lamp is preferably operated at a lower voltage, such as 14 volts, where the window 25 is formed of glass and 18 volts where the window 25 is formed of TPX plastic.

The photocell may comprise a Model CL604L sulfide-selenide photocell manufactured by Clairex Electronics, having a design life of at least approximately 10 years where the temperature is maintained so as not to exceed 100° F.

The sensor housing is preferably formed of a molded synthetic plastic, such as Hooker Durez 13856 black phenolic plastic, permitting the tubular portions 11 and 12 to be relatively thin-walled while yet effectively preventing transmission of ambient light therethrough to adversely affect the accuracy of the control. Further, the use of a black material provides for absorbing stray light from the lamp 24 striking the end surfaces of the windows thereby further maintaining the accuracy of the device.

For further increased sensitivity and maintained accuracy, it is desirable to provide caulking 28, such as opaque Dow Corning Corporation RTV Silastic caulking material, on the rear surface of the photocell 26.

In one highly efficient sensor control 10 embodying the invention, well 14 had a depth of approximately 0.100 inch and an outer diameter of approximately 1.250 inch The spacing 16 between openings 17 and 18 was approximately one sixteenth inch and the bores 22 and 23 of the sensor portions 11 and 12 were disposed at 45° to the vertical so as to be mutually perpendicular and spaced equally from the opposite sides of the centerline of the control.

Figure 1:
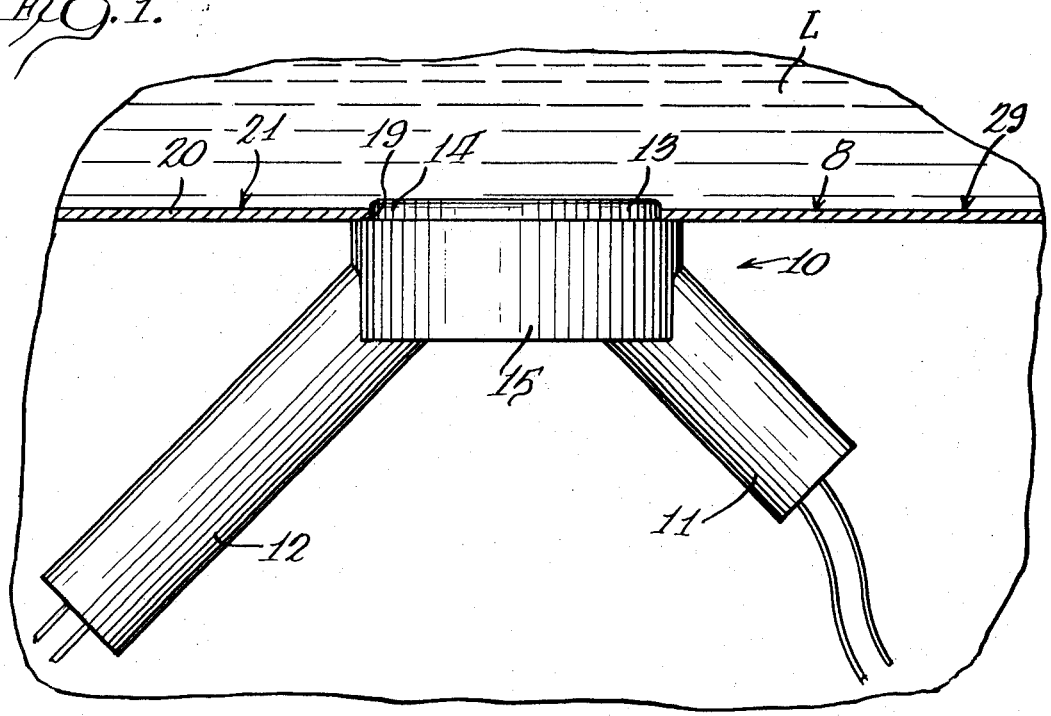
FIG. 1 is a fragmentary vertical section of a portion of a washing appliance in which is disposed a liquid condition sensor control shown in side elevation embodying the invention.

The use of sensor control 10 may be best understood with reference to the schematic wiring diagram of FIG. 3. As indicated above, in the washing and rinsing cycles of the washing apparatus shown in the form of a dishwasher, a body of liquid is disposed above the sump wall 20, as shown in FIG. 1. The control is arranged so that when there is at least approximately three eighths inch of such liquid above the bottom wall 20, the control provides a turbidity determination. When the water is drained from the sump 20, a quantity of liquid L is trapped in the well 14 and the control then functions to provide a dryness determination. More specifically, it has been found that where the depth of the water in well 14 is approximately one twentieth inch or less, the control responds only to the water depth. The control functions as an analog system wherein the depth of the water trapped in the well corresponds accurately to the dryness of the washed article, as it has been found that the rate of evaporation of the collected well liquid corresponds to the rate of evaporation of the liquid from the washed articles. Thus, the output signal from the sensor 10 defines a dryness signal.

The washing appliance, or dishwasher 29 may be provided with a detergent cup 30 having a lid 31 actuating a single pole, single throw switch 32 connected to power supply lead L1 of a conventional 27-volt DC power supply. A second detergent cup 33 may be provided adjacent cup 30. The other power supply lead L2 is connected through a pushbutton switch 34 and a series resistor 35, which illustratively may have a value of 100 Kilohms, to a start button 36 associated with a timer programmer 37 comprising the control of the washing appliance 29. The control 37 provides the output signals for motor pump operation 38, solenoid fill 39, heater operation 40, detergent cup solenoid opening operation 41 and reverse motor operation for drain 42.

A complete description of the operation of the control 37 and the detecting circuit generally designated 53 is set out in my copending application Ser. No. 380,102, filed July 17, 1973, and entitled Control System for Dishwasher.

Lamp 24 is connected in series with a voltage dropping resistor 43 between power supply lead L1 and ground. Photocell 26 is connected in series between power supply lead L1 and a series resistor 44, which illustratively may have a value of approximately 4.7 Kilohms, connected to ground. Photocell 26 defines a variable resistance as a function of the amount of light striking the photocell and thus cooperates with resistor 44 in providing a variable voltage to the base 45b of a transistor 45 which illustratively comprises a 2N6517 transistor. The emitter 45e of transistor 45 is connected through a pair of diodes 46 and 47 to ground. The emitter 45e is also connected through a resistor 48, which may have a value of 22 Kilohms, to power supply lead L1. The collector 45c of transistor 45 may be connected through a resistor 49, illustratively having a value of 47 Kilohms, to power supply lead L1. Collector 45c provides a signal to input 50 of timer programmer 37 as a function of the resistance of photocell 26. A second input signal 51 is provided from switch 32 which is connected in series with a resistor 52, which illustratively may have a value of 100 Kilohms.

The present invention is concerned with the sensor 10 and the provision of the variable voltage signal to the detecting circuit 53 and, thus, a complete understanding of the operation of the detecting circuit 53 and control 37 described in detail in my copending application, Ser. No. 380,102, is not necessary for a complete understanding of the present invention.

Assuming that the appliance 29 is a dishwasher as shown, the sensor 10 is firstly utilized to determine the turbidity of the dishwashing liquid. In this operation, light passes from lamp 24 upwardly through window 25 to impinge on the solid material carried in the liquid above the bottom wall 16. As indicated above, the depth of the water at this time should be at least six tenths inch above the bottom wall. In the normal dishwasher, the liquid fill is to a level at least 1 inch above the bottom wall so that normally more than sufficient depth of dishwashing liquid is available.

The light emanating from window 25 is reflected by the solid material in the liquid L to pass downwardly through window 27 to photocell 26. As discussed above, a variation in the amount of light so received by photocell 26 provides an adjustable voltage to the detecting circuit 53 thereby to provide information to the control 37. When the water is clear, light will not be reflected back to the photocell and the amount of light reflected will vary as a function of the amount of turbidity corresponding to the amount of solid material in the washing liquid. The turbidity measurement should be made only after the water is permitted to remain quiescent sufficiently long to permit the photocell resistance to reach a steady value. It has been found that a time of approximately 10 to 20 seconds is sufficient for the liquid to become sufficiently quiescent for this purpose. The resistance of the photocell varies by a factor of more than 1,000 in the normal sensing of the turbidity. It has been found that dissolved detergent in the dishwashing liquid has substantially no effect on the turbidity sensing and that the sensing is due substantially entirely to the presence of solid materials being cleaned from the articles being washed. Such a substantial change in the resistance of photocell 26 may obviously be utilized in conjunction with any suitable control for effecting desired control of the dishwasher. Thus, the detecting circuit 53 and control 37 are exemplary only.

In using the sensor 10 as a dryness sensor, the light reflected from the underside of the upper surface 54 of the liquid L in well 14 is used to provide the desired control signal. Thus, the dryness determination is made after the liquid L is drained from the sump leaving only the collected body of liquid in the well 14, as shown in FIG. 3. Light from lamp 24 reflects from the underside of upper surface 54 back to photocell 26. The resistance of the disclosed photocell has been found to vary to from 4,000 ohms to about 10,000,000 ohms as the level of the liquid in the well drops from the top of the well substantially to the bottom of the well. As will be obvious to those skilled in the art, adjustment in the amount of drying time can be affected by changing the depth of the well and by locating the sensor an appropriate distance away from the sheathed resistance heater present in conventional dishwashers. The signal obtained during the dryness determination is again delivered to the detecting circuit 53 and control 37 as a voltage input signal which is used by the control 37 to terminate the drying operation. Compensation for variations in the characteristics of lamp 24 and photocell 26 can be made at the time the sensor 10 is assembled by adjusting the distance between the lamp 24 and window 25 in positioning the lamp within the bore 22.

The window 27 has a sufficient length to effectively prevent damage to the photocell 26 from the relatively high temperature washing liquid. Illustratively, such washing liquid may have a temperature of approximately 180° F. with the window 27 having a sufficient length to assure that the temperature of the photocell does not exceed 100° F. notwithstanding the presence of the relatively high temperature indicated in the sump. As sensor 10 is formed of a black material, light from lamp 24 is directed to the liquid in the well and sump and is effectively prevented from leaking directly to the photocell through the walls of the portions 11 and 12.

Variations in the parameters of the washing apparatus shown herein as a dishwasher, such as the voltage applied to the electric heater of the apparatus, and the ambient temperature and humidity conditions do not affect the accuracy of the dryness determination as these conditions affect not only the rate of drying of the articles to be dried, but also the rate of evaporation of the liquid from the well.

Location of the lamp 24 may be adjusted to provide adjustment of the system for variations in the characteristics of the photocell and lamp. It has been found to be desirable to locate the lamp relatively close to the window 25 to provide for effectively minimum resistance of photocell 26 in the turbidity determining operation.

Thus, sensor control 10 provides an improved low cost device for providing both turbidity and dryness determinations in an apparatus such as a dishwasher or the like. The foregoing disclosure of specific embodiments is illustrative of the broad inventive concepts comprehended by the invention.

The embodiment of the invention in which an exclusive property or privilege is claimed is defined as follows:

1. In a dishwasher having a tub, liquid sensor means mounted in a lower wall portion of said tub, said sensor means comprising: means defining a well opening upwardly to said tub for receiving and holding a preselected quantity of liquid from the tub, said well having a bottom wall; means for directing preselected light upwardly through said bottom wall to be redirected downwardly by liquid in said well; means for sensing light so deflected; and means providing an output signal corresponding to the level of the sensed deflected light.

2. In a dishwasher as claimed in claim 1 wherein said light sensing means and output means comprise means for providing a turbidity output signal corresponding to the level of the light reflected from reflective material carried in the liquid in and above the well.

3. In a dishwasher as claimed in claim 1 wherein said light sensing means and output means comprise means for providing a dryness output signal corresponding to the level of light reflected from the upper surface of the liquid in the well.

4. In a dishwasher having a tub, liquid sensor means mounted in a lower wall portion of said tub, said sensor means comprising: means defining a well having a bottom wall; means for directing preselected light upwardly through said bottom wall to be redirected downwardly by liquid in said well; means for sensing light so deflected; and means providing an output signal corresponding to the level of the sensed deflected light, said light sensing means and output means comprising means for selectively providing a turbidity output signal corresponding to the level of the light reflected from reflective material carried in the liquid in the well and a dryness output signal corresponding to the level of light reflected from the upper surface of the liquid in and above the well.

5. A liquid condition sensor control comprising: means defining a well having a bottom wall having means for conducting light upwardly through a first portion of the bottom wall and downwardly through a second portion thereof; means for directing preselected light upwardly through said first portion of the bottom wall to be redirected by liquid in said well downwardly through said second portion of the bottom wall; means for sensing light so redirected; and means for providing an output signal corresponding to the level of the sensed light.

6. The liquid condition sensor of claim 5 wherein said bottom wall defines means for carrying both said light directing means and light sensing means.

7. The liquid condition sensor of claim 5 wherein said light directing means and said sensing means are directed to act through said bottom wall at converging angles to the vertical.

8. The liquid condition sensor of claim 5 wherein said light directing means and said sensing means are directed to act through said bottom wall perpendicularly to each other.

9. The liquid condition sensor of claim 5 wherein said light directing means and said sensing means are directed to act through said bottom wall at 45° converging angles to the vertical.

10. The liquid condition sensor of claim 5 wherein said sensing means comprises a photocell and means integral with said well means for housing the photocell to be exposed to said well upwardly through said bottom wall.

11. The liquid condition sensor of claim 5 wherein said light sensing means and output means comprise means for providing a turbidity output signal corresponding to the level of the light reflected from reflective material carried in the liquid in and above the well.

12. The liquid condition sensor of claim 5 wherein light sensing means and output means comprise means for providing a dryness output signal corresponding to the level of light reflected from the upper surface of the liquid in the well.

13. The liquid condition sensor of claim 5 wherein the light directing means and sensing means open to said well through openings in the bottom wall spaced apart a small preselected distance.

14. The liquid condition sensor of claim 5 wherein said sensing means comprises means defining an elongated passage opening through said bottom wall, a photocell in said passage spaced substantially from said bottom wall, and an elongated transparent window element in said passage between said photocell and bottom wall thermally insulating said photocell from liquid in the well.

15. The liquid condition sensor of claim 5 wherein means are provided for adjustably positioning said illuminating means.

16. The liquid condition sensor of claim 5 wherein said sensing means comprises an opaque tubular structure having one end opening through said bottom wall, a photocell mounted in the tube at the opposite end, and a transparent element in the tube between said one end and the photocell.

17. The liquid condition sensor of claim 5 wherein said sensing means comprises means defining an elongated passage opening through said bottom wall, a photocell in said passage spaced substantially from said bottom wall, and an elongated transparent window element in said passage between said photocell and bottom wall and having a length of at least approximately 1 ½ inches for thermally insulating said photocell from liquid in the well.

18. The liquid condition sensor of claim 5 wherein a housing formed of a synthetic plastic is provided for housing each of said light directing means and sensing means adjacent said well means.

19. The liquid condition sensor of claim 5 wherein a housing formed of a synthetic plastic is provided for housing each of said light directing means and sensing means subjacent said well means.

20. The liquid condition sensor of claim 5 wherein said sensing means comprises means defining an elongated passage opening through said bottom wall, a photocell in said passage spaced substantially from said bottom wall, an elongated transparent window element in said passage between said photocell and bottom wall thermally insulating said photocell from liquid in the well, and opaque caulk means on the rear of said photocell.

21. A liquid condition sensor control comprising: means defining a well having a bottom wall; means for directing preselected light upwardly through said bottom wall to be redirected downwardly by liquid in said well; means for sensing light so deflected; and means providing an output signal corresponding to the level of the sensed deflected light, said light sensing means and output means comprising means for selectively providing a turbidity output signal corresponding to the level of the light reflected from reflective material carried in the liquid in the well and a dryness output signal corresponding to the level of light reflected from the upper surface of the liquid in and above the well.

22. The method of determining turbidity and evaporation of a liquid comprising:
   directing radiation upwardly into the liquid;
   directing a radiation sensing means into the liquid at an angle to the direction of radiation thereinto to sense radiation reflected from solids carried by said liquid and sense radiation reflected from the underside of the upper surface of the liquid; and providing selectively a first, turbidity measure output corresponding to the sensed reflection from the solids in the liquid and a second, evaporation measure output corresponding to the sensed reflection from the upper surface of the liquid.

23. The method of determining turbidity and evaporation of a liquid of claim 22 wherein said step of sensing the radiation reflected from the underside of the upper surface of the liquid is effected only when the sensed turbidity is below a preselected value.

24. The method of determining turbidity and evaporation of a liquid of claim 22 wherein said angle is approximately 90°.

25. The method of determining turbidity and evaporation of a liquid of claim 22 wherein the radiation is directed upwardly at a preselected angle to the vertical and the sensing means is directed upwardly at an opposite and equal angle to the vertical.

26. The method of determining turbidity and evaporation of a liquid of claim 22 wherein said sensing means is directed into the liquid at a position spaced a preselected distance from the position at which the radiation is directed into the liquid.

27. The method of determining turbidity and evaporation of a liquid of claim 22 wherein radiation reflected from the underside of the upper surface of the liquid when the depth of the liquid is less than approximately 0.1 inch.

28. The method of determining turbidity and evaporation of a liquid of claim 22 wherein a plurality of determinations are made seriatim and said step of sensing the radiation reflected from the underside of the upper surface is effected only when the sensed turbidity is below a preselected value.

* * * * *